United States Patent Office

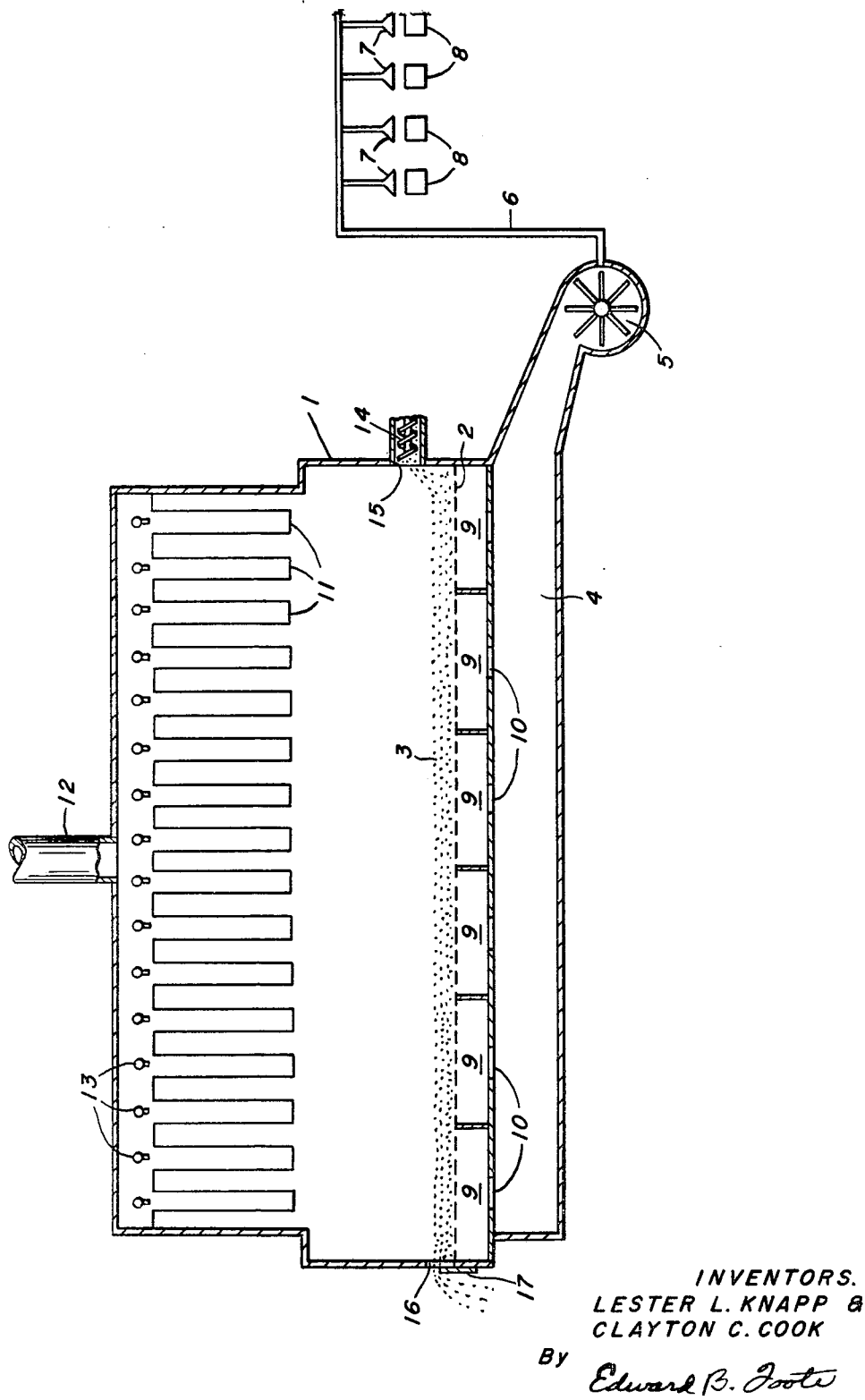

3,503,184
Patented Mar. 31, 1970

3,503,184
TREATMENT OF GASES EVOLVED IN THE PRODUCTION OF ALUMINUM
Lester L. Knapp and Clayton C. Cook, Maryville, Tenn., assignors to Aluminum Company of America, Pittsburgh, Pa., a corporation of Pennsylvania
Filed Mar. 7, 1968, Ser. No. 711,279
Int. Cl. B01d 19/00; C01b 9/08
U.S. Cl. 55—71       5 Claims

ABSTRACT OF THE DISCLOSURE

Hydrogen fluoride and finely divided solids are removed from gases evolved in the electrolytic production of aluminum, by means of a bed of alumina particles fluidized by a stream of such gases. Alumina particles combined with the hydrogen fluoride, and finely divided solids entrapped in the bed, discharge from the bed.

BACKGROUND OF THE INVENTION

This invention relates to the treatment of gases evolved in the electrolytic production of aluminum, and it relates particularly to the removal of gaseous hydrogen fluoride and finely divided solids from such gases.

As is well known, aluminum is generally produced commercially in electrolytic cells or "reduction pots," in which alumina dissolved in molten cryolite, with or without other fluorides such as aluminum fluoride and calcium fluoride, is reduced to aluminum. Such electrolytic cells have a carbon lining that acts as the cathode of the cell, and also have carbon anodes which extend into the aforesaid bath of alumina and cryolite. Such cells evolve gaseous fluorine compounds (principally hydrogen fluoride) carbon monoxide, carbon dioxide, carbon disulfide and sulfur dioxide. Those gases, mixed with substantial amounts of air, as well as entrained finely divided alumina, carbon, and fluorides, are generally collected and treated by procedures designed to recover fluorine values and alumina therefrom as well as to minimize air pollution. Various procedures are known for that purpose, in which the mixture of gases and solids is treated with various liquid or solid reagents, sorbents and filtering devices, but in general they have been relatively expensive and in some instances have also been inadequate to accomplish the desired results.

It is the object of this invention to provide an impoved, highly efficient and economical method of removing gaseous hydrogen fluoride and entrained solids from gases produced in electrolytic production of aluminum, and it is a particular object of the invention to provide an improved process for that purpose by which substantially all of the fluorine values and entrained solids can be recovered economically and returned to the electrolytic cells.

SUMMARY OF THE INVENTION

In carrying out this invention, a continuous stream of gases evolved in the electrolytic production of aluminum is conducted rapidly, at a low pressure drop through a thin, fluidized bed composed of a large volume of finely divided particles of alumina of a grade suitable for addition to the fluoride bath in electrolytic cells, whereby gaseous hydrogen fluoride in the aforesaid gas stream is sorbed by the alumina particles and finely divided solids in the gas stream are entrapped in the fluidized bed. Gases leaving the fluidized bed pass through a filtering device located above the bed and the entrained solids removed thereby are returned directly into the bed.

Additional particles of alumina are fed into the bed continuously, i.e., either as a continuous stream or in periodic increments; simultaneously with such addition there is removed from the bed an equal volume of alumina particles and other solids, the removed particles of alumina having remained in the bed in contact with the gas stream for an average of two to fourteen hours.

DETAILED DESCRIPTION

The invention is described in more detail with reference to the accompanying drawing, which shows somewhat schematically apparatus for use in carrying out the invention. That apparatus includes an elongated chamber or vessel having a blower associated therewith for blowing into the chamber a continuous stream of the gases evolved in electrolytic cells for the production of aluminum; a bed of alumina particles fluidized in the elongated chamber by the gas stream; means for feeding additional alumina particles into the fluidized bed, and an overflow outlet for solids in the bed. Filtering means is provided directly above the fluidized bed for removal of entrained solids from the gas stream and return of such solids to the bed.

Referring to the drawings, in the elongated chamber 1 a horizontally disposed, perforated plate 2 supports a dense, turbulent fluidized bed 3 consisting primarily of finely divided alumina particles. At the base of the chamber 1 is a plenum chamber 4 extending substantially the entire length of the chamber 1 and having a blower unit 5 connected thereto. A conduit 6 connects the blower unit 5 with gas collecting hoods 7 over conventional electrolytic cells 8 (indicated diagrammatically) for the production of aluminum by reduction of alumina dissolved in molten cryolite. Gas distribution chambers 9 below the plate 2 communicate with the chamber 4 through spaced openings 10 in the top of chamber 4.

Conventional bag filters 11 made of porous fabric extend across the upper portion of chamber 1, above the bed 3. At the top of chamber 1 is a gas discharge conduit 12. Air jets 13 are provided for periodically dislodging deposited solids from the exterior of the filter bags by blowing a reverse air stream through the bags.

At one end of chamber 1 is a conveyor 14 for feeding finely divided alumina into the bed 3 through an inlet opening 15 in an end wall of the chamber. At the opposite end of the chamber 1 is an outlet opening 16 through which solids from the bed 3 can overflow to a suitable conveyor (not shown). An adjustable weir 17 at the opening 16 permits control of the depth of the bed 3 to assure adequate contact of the gas stream with the bed for the desired purposes.

In carrying out the invention in such apparatus, a stream of gases from the electrolytic cells 8 is blown through the plenum chamber 4 and the plate 2 by the blower 5, at a sufficient velocity to keep the bed 3 fluidized. That bed has a depth of only 2 to 12 inches, whereby the pressure drop through the bed is low (e.g. 3 to 6 inches of water) with attendant low cost of operation of the blower 5. However, 50 to 150 pounds of alumina is kept in the bed per pound of gaseous hydrogen fluoride present in the gas stream, thereby providing a large ratio of alumina to hydrogen fluoride.

The gas stream—which is at a temperature of 150–280° F.—passes through the bed 3 in from 0.25 to 1.5 seconds, depending on the bed depth and the velocity of the gas stream. Solids in the gas stream are entrapped in the bed 3. The gas stream leaving the bed 3 flows through the bag filters 11, depositing on the exterior of the bags remaining finely divided solids from the electrolytic cells, as well as alumina particles small enough to be carried upward out of the bed. Periodically sharp jets of air are blown into the bags 11 by the air jets 13, dislodging the solids that had been deposited on the bags' exterior surfaces, whereupon the dislodged solids fall back into the bed 3.

As additional alumina particles are fed into the bed 3 by the conveyor 14, solids adjacent the outlet 16 flow automatically out of the bed through that outlet. As a result of the substantial distance between the inlet 15 and the outlet 16, and the heterogeneous, irregular path of movement of particles in a fluidized bed, the average time of passage of a particle of alumina across and out of the bed is two to fourteen hours, thereby insuring ample opportunity for contact of the particles with gaseous hydrogen fluoride in the bed. Such average time of passage of the particles through the bed is referred to herein as "average residence time."

The alumina particles fed into the bed 3 are of the same grade of alumina as is normally used for production of aluminum in electrolytic cells. That grade of alumina is of low porosity, but nevertheless gaseous hydrogen fluoride in the bed is taken up by the alumina particles, apparently by adsorption.

The materials leaving the bed consist of solids which have been removed from the gas stream and entrapped in the bed, as well as alumina particles carrying hydrogen fluoride. The latter particles are referred to herein as alumina particles containing hydrogen fluoride, although it may be that hydrogen fluoride initially sorbed on the alumina has reacted, at least in part, with the alumina by the time the alumina particles leave the bed. The mixture leaving the bed can then be fed into the fluoride bath in one or more of the cells 8, thus returning the recovered fluorine values to the cells and thereby providing a portion of the fluoride values needed in the fluoride bath of the cell, as well as supplying alumina to the cell for conversion to aluminum.

By procedures described above, 99–100% of the total hydrogen fluoride and other fluorides in the gas stream can be removed, over a wide range of total fluoride content in the gas stream, and even though the percentage of fluorides present in the gas stream is quite low, e.g. less than 35 milligrams per cubic foot.

Moreover, the process is highly economical in view of the relatively inexpensive equipment and operating conditions employed, and the very high efficiency of recovery of fluoride.

It will be understood that although specific apparatus has been described for carrying out the invention, other apparatus and embodiments can be employed without departing from the spirit of the invention.

We claim:
1. The method of treating gases evolved from electrolytic cells for the production of aluminum to remove therefrom gaseous hydrogen fluoride and finely divided solids, comprising passing a continuous stream of the said gases containing less than 35 milligrams of fluoride per cubic foot at a temperature of 150–280° F. upwardly through a bed of finely divided alumina particles at a sufficient velocity to maintain the said bed in a dense, fluidized condition, the said bed being 2–12 inches deep and containing 50–150 pounds of alumina per pound of hydrogen fluoride in the gas stream, the individual gas molecules in the said stream passing through the said bed in 0.25–1.5 seconds so that hydrogen fluoride in the said gas stream is sorbed by the said alumina particles, and finely divided solids in the gas stream are entrapped by the bed, and removing from the said bed resultant alumina particles containing hydrogen fluoride.

2. The method in accordance with claim 1, in which the said alumina particles have an average residence time in the said bed of 2–14 hours.

3. The method in accordance with claim 1, in which entrained solids in the gas stream above the said bed are separated from the gas stream and returned to the bed.

4. The method in accordance with claim 1, in which the gas pressure drop through the said bed is equal to 3–6 inches of water.

5. The method of treating gases evolved from electrolytic cells for the production of aluminum to remove therefrom gaseous hydrogen fluoride and finely divided solids, comprising passing a continuous stream of the said gases containing less than 35 milligrams of fluoride per cubic foot at a temperature of 150–280° F. upwardly through a bed of finely divided alumina particles at a sufficient velocity to maintain the said bed in a dense, fluidized condition, the said bed being 2–12 inches deep and containing 50–150 pounds of alumina per pound of hydrogen fluoride in the gas stream, the individual gas molecules in the said stream passing through the said bed in 0.25–1.5 seconds so that hydrogen fluoride gas deposits on the said alumina particles as hydrogen fluoride, and finely divided solids in the gas stream are entrapped by the bed, and removing from the said bed such alumina particles containing hydrogen fluoride.

References Cited

UNITED STATES PATENTS

| | | | |
|---|---|---|---|
| 2,919,174 | 12/1959 | Pring | 23—153 |
| 2,934,405 | 4/1960 | Schmidl | 23—88 |
| 2,996,354 | 8/1961 | Lacroix | 23—88 |
| 3,104,156 | 9/1963 | Saccardo et al. | 23—88 |
| 3,385,658 | 5/1968 | Broja | 23—88 |

REUBEN FRIEDMAN, Primary Examiner

C. N. HART, Assistant Examiner

U.S. Cl. X.R.

23—88; 55—77